Jan. 4, 1966   L. LAGUERRE   3,227,358
HANDLE AND CLOSURE DEVICE FOR THERMOPLASTIC BAGS
Filed Jan. 3, 1964   2 Sheets-Sheet 1
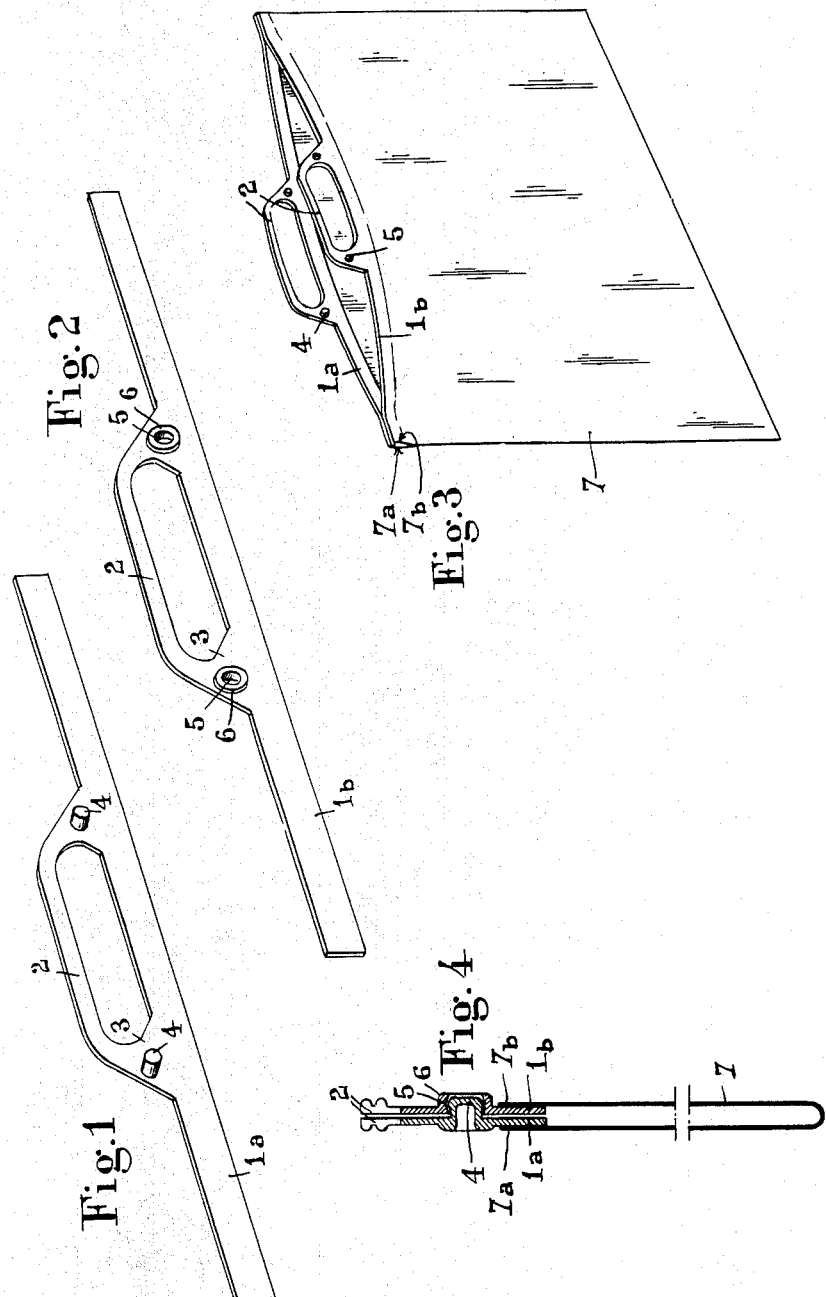

Jan. 4, 1966  L. LAGUERRE  3,227,358
HANDLE AND CLOSURE DEVICE FOR THERMOPLASTIC BAGS
Filed Jan. 3, 1964  2 Sheets-Sheet 2
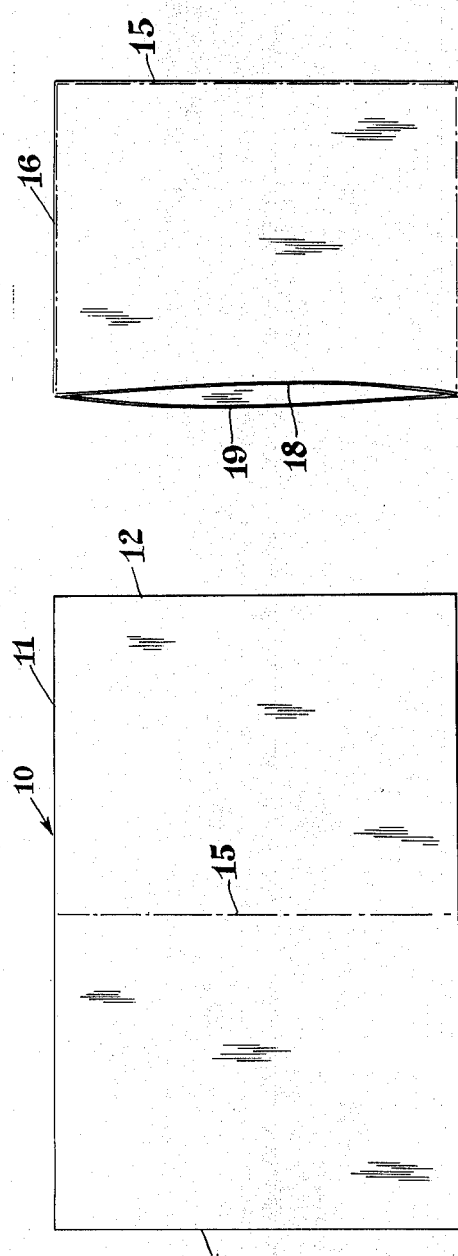
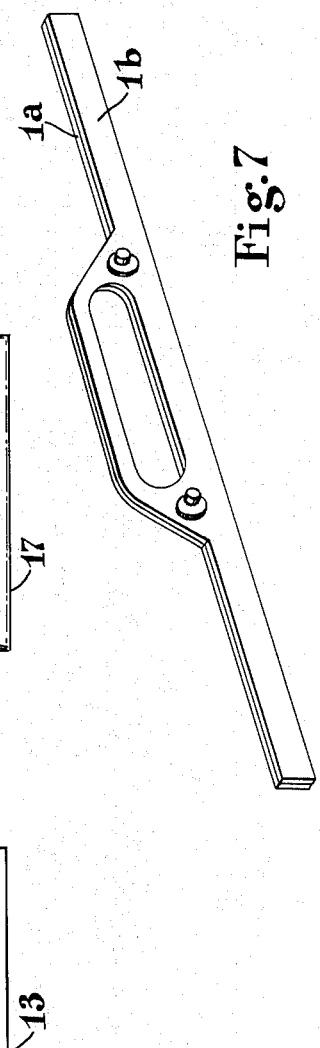
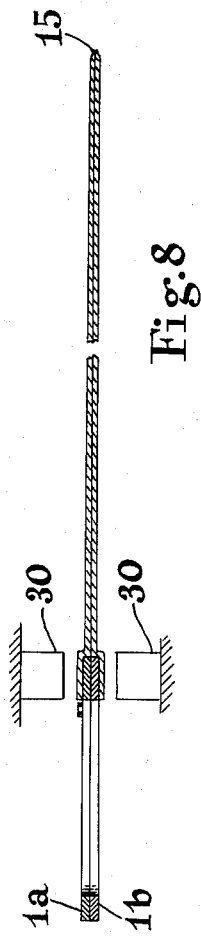

United States Patent Office 3,227,358
Patented Jan. 4, 1966

3,227,358
HANDLE AND CLOSURE DEVICE FOR
THERMOPLASTIC BAGS
Leon Laguerre, 44 Rue Escudier, Boulogne sur
Seine, France
Filed Jan. 3, 1964, Ser. No. 335,561
The portion of the term of the patent subsequent to
July 6, 1981, has been disclaimed and dedicated to
the Public
1 Claim. (Cl. 229—54)

This invention is a continuation-in-part of my co-pending application Serial No. 188,618, filed April 19, 1962, entitled Handle and Closure Device for Thermoplastic Bags, now Patent Number 3,140,038.

This invention relates to devices for gripping and closing bags designed for holding any products or articles.

It is known that certain paper bags are provided with cardboard gripping handles secured by gluing or stapling. However, handles of this general type are unsuitable for equipping thermoplastic bags and notably polyethylene bags. In fact, they cannot be secured either by gluing or by stapling, for in this last case there would be the risk of tearing the thermoplastic material of the bag.

Therefore, it is the essential object of this invention to provide a handle or like gripping device adapted to be fitted on thermoplastic bags, this device being also designed with a view to closing the bag on which it is fitted.

This device comprises essentially a pair of strips or bands also of thermoplastic material, each provided along one of its edges with a central gripping handle or bow, both strips being furthermore provided with snap-action coupling means, for example, of the stud and hole type, constituting a kind of dome fastener.

The two bands or strips of the device are adapted to be sealed by heat welding along the edges of a thermoplastic bag. Thus, the two registering strips or bands constitute the two complementary bows of a gripping handle. On the other hand, when these bands or strips are fastened to each other through the aforesaid coupling means, the device constitutes at the same time a closing system for the bag proper.

This invention is also concerned with thermoplastic bags provided with the gripping and closing device broadly set forth hereinabove.

A typical embodiment of a gripping and closing device according to this invention, and of a bag equipped therewith, will now be described with reference to the accompanying drawing, wherein:

FIGURES 1 and 2 are perspective views showing separately the two component elements of the device of this invention.

FIGURE 3 illustrates in perspective view, but on a smaller scale, a thermoplastic bag equipped with the device of FIGURES 1 and 2.

FIGURE 4 is a cross section illustrating the handle and bag assembly in its closed condition.

FIGURE 5 is a view in elevation of a blank of thermoplastic material constituting a first step in the disclosed method of manufacturing an integrated thermoplastic bag and closure handle means therefor.

FIGURE 6 is a view in perspective showing the blank of FIGURE 5 in laminated condition to define an open end thereof.

FIGURE 7 is a view in perspective showing the structure of FIGURES 1 and 2 in selectively interconnected condition.

FIGURE 8 is a schematic view showing the interconnection of the structure of FIGURE 7 into the open end of the structure shown in FIGURE 6, to complete the assembly of a finished bag.

The device illustrated in FIGURES 1 and 2 consists essentially of a pair of bands or strips 1a and 1b, made preferably of suitable thermoplastic material, for example polyethylene, if this device is designed for equipping polyethylene bags. These two strips have a thickness greater than that of the sheets of polyethylene or other plastic material constituting the bag proper according to the conventional manufacture of these bags. Thus, the thickness of these strips may vary, for example, from 0.04" to 0.08". They are relatively stiffer than the sheets from which the bags are made. Each strip is formed along one edge with an integral central gripping bow or handle 2, the assembly being formed by molding. These handles or bows may have any suitable configuration. Preferably, their bases 3, which correspond to the connection between the handles or bows 2 and the strips 1a, 1b, have a greater width in order to increase the strength of the assembly.

These members constitute the two complementary elements of the device of this invention. These two members are provided with releasable coupling means of the snap-action type consisting, for example, of complementary projections and recesses formed on the two members respectively.

In the example illustrated, these coupling means consist of a pair of studs 4 formed integrally on the first strip 1a and of a pair of registering holes or recesses 5 formed in the other strip 1b, these holes or recesses 5 being adapted to receive the studs 4 so that the latter engage the former by snap action. To this end, the diameter of the studs 4 increases preferably from the root outwards, as best shown in FIGURE 4, and the holes or recesses 5 are shaped accordingly. The strip 1b may be formed with a reinforced circular rib 6 around each hole or recess 5, as shown. The snap-action fitting of the studs 4 into the holes or recesses 5 is permitted by the relative flexibility of the plastic material constituting the two strips 1a and 1b. Preferably, the studs 4 are hollow (see FIGURE 4) in order to increase their resiliency. Thus, the studs 4 act somewhat like dome-fasteners, permitting a quick assembly of the two strips 1a, 1b, with each other.

According to an important feature of this invention, these fastening or coupling means are located intermediate the base portions 3 of bows 2 (see FIGURES 1 and 2). This specific position of the coupling means ensures a better fastening of the two strips 1a and 1b in practice, as will be explained presently.

In fact, the two main component elements 1a and 1b of the device are intended to be secured along the two upper edges 7a, 7b of the open side of a thermoplastic bag 7. This assembly may be obtained very easily by heat welding each edge of the bag on the relevent strip 1a or 1b. By construction, the length of these two strips corresponds to the width of the bag. Thus, they act at the same time as means for reinforcing the edges of the thermoplastic bag and, owing to their thickness which is greater than that of the walls of the bag, they also assist in stiffening these walls.

However, the device according to this invention is particularly advantageous in that it ensures a perfect closing of the bag. In fact, it is sufficient to press the two strips 1a and 1b against each other in order to engage the studs 4 into the holes or recesses 5, so that the two strips 1a and 1b, and, therefore, the edges of the bag to which they are attached, are tightly clamped together.

In this respect, it may be noted that even if the bag contains relatively heavy products or articles and is held by means of the handle, its edges will not tend to gape or open. In fact, as already explained hereinabove, the edges of the bag are stiffened by the pair of strips 1a and 1b. On the other hand, the very particular position of the studs 4 and of their corresponding holes or recesses 5 will prevent the weight of the products or articles contained in the bag from tending to move the edges of the bag away from each other, even to a moderate extent.

When the two bows 2 are thus assembled with each other, they constitute a single or unitary gripping handle whereby the bag equipped with this device can be transported very conveniently. As already disclosed above, this invention is also concerned with thermoplastic bags provided with this closing and gripping device.

These bags can be opened and closed a great number of times without any inconvenience. On the other hand, they can be used for transporting relatively heavy objects. They can be used for many applications, for example as packing means, for selling miscellaneous articles or products, or as bags for transporting a great number of different articles or products.

As already explained hereinabove, the bows formed on the two complementary members of the device may have a different configuration. Similarly, the coupling means provided thereon for closing the bag may differ from the type illustrated. Thus, the studs and recesses or holes constituting the dome-fasteners illustrated may be replaced by ribs or other projections adapted to fit by snap action into registering grooves or other adequate recesses.

The two component elements of the device may be made from any suitable thermoplastic material, according to the material from which the bags themselves are made, in order to permit the sealing of the former on the latter.

Turning to FIGURE 5 in the drawings, there is illustrated a unitary blank of synthetic resinous material, the precise nature of which will depend upon the material from which the structure 1a, 1b is formed, so as to be compatible for sealing therewith. The blank, generally indicated by reference character 10, is illustrated as being essentially rectangular in configuration, but it will be understood that trapezoidal and other shapes defining two abuttable edges may also be employed. The blank is bounded by rectilinear edges 11, 12, 13 and 14, and, as illustrated in FIGURE 6, the blank is foldable about line 15 wherein an open ended bag is formed having two mutually sealed edges 16 and 17, and two abutted free edges 18 and 19 which define an open mouth to the bag.

As a subsequent step, the structure shown in FIGURES 1 and 2 are now selectively interconnected so as to be properly aligned when the same are interconnected within the open mouth formed by the edges 18 and 19. Following this step, the structure illustrated in FIGURES 6 and 7 is placed between a heat-sealing device 30 in such manner that the elements 1a and 1b, in interconnected condition, are positioned on the inner surfaces of the bag formed from the blank 10. The heat-sealing device 30 then interconnects the rectilinear edges of the elements 1a and 1b with the inner surfaces of the bag, to result in a completed article as shown in FIGURE 3.

Where desired, the blank 10 may be formed as a continuous tubular extrusion, in which case the edges 15 and 16 will be formed integrally, and the edge 15 will be sealed. This sealing operation may take place simultaneously with the interconnection of the elements 1a and 1b within the mouth of the bag, rather than as a serial operation.

I wish it to be understood that I do not consider the invention limited to the precise details of structure shown and set forth in this specification, for obvious modifications will occur to those skilled in the art to which the invention pertains.

I claim:

A handle and closure device adapted to be fitted in a thermoplastic bag which comprises two flat generally rectangularly shaped thermoplastic strips adapted to be heat welded along the two opposed edges of the opening of said bag, each of said strips being bounded by two substantially parallel edges; a centrally disposed looped gripping handle formed integrally with said strip and extending laterally of one of said edges, complementary projections and recesses formed on said strips and adapted to engage each other by releasably coupling said strips in parallel coextensive relation, in which condition said gripping handles overlie each other in like coextensive relation.

References Cited by the Examiner
UNITED STATES PATENTS

| 2,978,769 | 4/1961 | Harrah | 150—3 |
| 3,140,038 | 7/1964 | Laguerre | 229—54 |

GEORGE O. RALSTON, *Primary Examiner.*

FRANKLIN T. GARRETT, JOSEPH R. LECLAIR, *Examiners.*

J. F. McNULTY, *Assistant Examiner.*